Patented Aug. 12, 1952

2,606,881

UNITED STATES PATENT OFFICE 2,606,881

POLYMERIZATION OF POLYALLYL AND POLYMETHALLYL ETHERS OF POLYHYDROXY COMPOUNDS

Morris Zief and Elias Yanovsky, Philadelphia, Pa., assignors to the United States of America as represented by the Secretary of Agriculture No Drawing. Application April 8, 1949, Serial No. 86,402

6 Claims. (Cl. 260—17.4)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the polymerization of liquid, polymerizable unsaturated ethers, particularly the polyallyl and polymethallyl ethers, of polyhydroxy compounds, and has among its objects increasing their polymerization rate.

Many unsaturated ethers of the polyhydroxy compounds are known, for example, unsaturated ethers of polyhydroxy alcohols, such as the polyallyl and polymethallyl ethers of carbohydrates and of other polyhydric compounds, like cellulose, starch, sucrose, mannitol, pentaerythritol, glycerol and the like. Many of these compounds can be used as film-forming materials or plastic compositions which on polymerization yield products that are highly resistant to the action of heat, solvents and other reagents.

Some of these ethers, for example, the polyallyl ethers of starch and of cellulose, are solids. Others like the polyallyl ethers of sucrose are liquids. When the solid ethers, like polyallyl starch, for instance, are applied from a solution in a volatile solvent on the surface of wood or other material, the resulting coating becomes dry (tack-free) as soon as the solvent has evaporated, after which the polymerization of the solid residue proceeds slowly at ordinary temperature and faster at elevated temperature. The liquid ethers, however, such as polyallyl sucrose and others, when utilized either as such, or in the form of solutions, will remain tacky for many hours, thus collecting dust and dirt on the coated surface.

This defect can be remedied by blowing air or oxygen through the liquid, polymerizable unsaturated ether, preferably at elevated temperature, thereby gradually increasing the viscosity of the treated material and converting it to a product which is more rapidly polymerized to a dry, non-tacky substance. The progress of this viscosity-increasing treatment, which must be stopped before the formation of a gel occurs, can be followed either by measuring the viscosity at certain intervals or, which is simpler, by measuring the refractive index of the treated material which increases with the increase in viscosity.

The process of blowing air or oxygen through the liquid, polymerizable unsaturated ether at elevated temperature is time consuming and adds to the cost of these products so that any procedure that will shorten the duration of the process facilitates the utilization of such ethers as coating compositions or for other purposes.

We have found that polymerization of the liquid, unsaturated ethers of polyhydric compounds takes place more readily or rapidly if such ethers are blended with an ester of acrylic or methacrylic acid. Thus, the bodying process, whereby the viscosity of such ethers is gradually increased as a result of partial polymerization on contact with oxygen, proceeds more rapidly.

In general, according to the invention, a liquid, polymerizable polyallyl or polymethallyl ether of the polyhydroxy compound which is free of functional groups other than hydroxyl is mixed with a suitable ester of acrylic or methacrylic acid in an amount sufficient to enhance the rate of viscosity increase and the resulting mixture contacted with oxygen, preferably by passing a current of oxygen or of a gas containing free oxygen, such as air, through the body of the mixture, preferably at elevated temperature, for a length of time sufficient to cause the desired increase in the viscosity of the material treated but not sufficient to convert it to a gel. The "blown" or "bodied" products thus obtained when utilized in the production of coating or film-forming compositions, plastics and other similar resinous products, rapidly polymerize to dry, non-tacky substances which display the desirable characteristics of the corresponding fully polymerized ethers.

The process is applicable to the production of bodied, partially polymerized products from any liquid, polymerizable polyallyl or polymethallyl ether of a polyhydric compound and from mixtures of such ethers. Suitable ethers include, for example, the polyallyl or polymethallyl ethers of polyhydric aliphatic alcohols containing from 2 to 8 hydroxyl groups, such as the polyallyl and polymethallyl ethers of glycols, like ethylene glycol, 1,3-butylene glycol and dipropylene glycol; glycerol, pentaerythritol, glucose or galactose; hexitols like mannitol, sorbitol and inositol; dipentaerythritol, and disaccharides such as sucrose, and of other similar polyhydric alcohol, like those described by Nichols and Yanovsky, J. Am. Chem. Soc. 66, 1625; 67,46; Talley, Vale and Yanovsky, ibid. 67, 2037; Nichols, Wrigley and Yanovsky, ibid. 68, 2020. The process is also applicable to liquid polymerizable ethers of polyhydric alcohols containing saturated as well as unsaturated ether groups, such as the mixed ethers like allyl-butyl and allyl-benzyl sucrose described by Zief and Yanovsky in their application Serial No. 21,545, now Patent No. 2,541,142 issued February 13, 1951.

Esters of acrylic and methacrylic acid adapted for use in carrying out the process of this invention are the esters of these acids with saturated or unsaturated aliphatic alcohols, aromatic alcohols, heterocyclic alcohols or phenolic compounds. Suitable esters include, for example, methyl, ethyl, propyl, butyl, ethyl hexyl, octyl and other alkyl acrylates and methacrylates; alkenyl esters of these acids such as allyl or methallyl acrylate and methacrylate; esters of alcohol-ethers like propoxyethanol or other alkoxyalcohols; esters of alicyclic alcohols such as cyclohexyl acrylate or methacrylate; esters of heterocyclic alcohols such as tetrahydrofurfurol, and of phenolic compounds, for example, the phenyl or tolyl esters, and in general, any organic ester containing the acyl radical of acrylic or alpha-alkylacrylic acid, used either singly or in combination.

The bodying process can be conducted at ordinary room temperature or with application of heat up to temperatures which cause incipient discoloration and/or decomposition of the material treated. Since the reaction rate increases with the temperature, it is usually advantageous to conduct the process at elevated temperature, for example, at about 100° C. Under such conditions, it is of course necessary to utilize as the ester component of the mixture acrylates or methacrylates that are not vaporized to any appreciable extent from the reaction mixture. Thus, for example, when operating at temperatures substantially below 100° C., a relatively low-boiling ester such as methyl acrylate may be used; when the process is conducted at 100° C., an ester boiling at a temperature substantially in excess of 100° C. should be employed.

The following examples are given as illustrative embodiments of a manner in which the invention may be carried out in practice.

Samples of allyl sucrose (containing 6.5 allyl groups per molecule) and of allyl mannitol (containing 4.2 allyl groups) were blended with various esters of acrylic or methacrylic acid, in a weight ratio of 1 to 1, and the gelation time of the resulting mixtures was determined at 100° C. essentially by the procedure described by Nichols et al., J. Am. Chem. Soc. 68, 2020. Some of the results thus obtained are shown in the following table:

| Example | Ether of Polyhydroxy Compound | Ester of Acrylic or Methacrylic acid | Gelation Time (minutes) |
| --- | --- | --- | --- |
| Control | Allyl sucrose | None | 210 |
| I | do | m-tolyl acrylate | 135 |
| II | do | butyl methacrylate | 106 |
| III | do | phenyl methacrylate | 87 |
| IV | do | 2-ethylhexyl acrylate | 69 |
| V | do | octyl methacrylate | 51 |
| VI | do | isopropoxyethyl acrylate | 38 |
| VII | do | cyclohexyl acrylate | 37 |
| VIII | do | tetrahydrofurfuryl methacrylate | 19 |
| Control | Allyl mannitol | none | 297 |
| IX | do | octyl methacrylate | 107 |
| X | do | cyclohexyl acrylate | 35 |
| XI | do | tetrahydrofurfuryl methacrylate | 21 |

The above table shows that certain of the unsaturated ethers of sucrose and of mannitol polymerize more rapidly in the presence of an ester of acrylic or methacrylic acid; other liquid polymerizable unsaturated ethers of polyhydric compounds display similar characteristics. It is apparent that the gelation time of various mixtures can be controlled within wide limits by a proper selection of the components and by varying the proportions of the constituents of the mixture.

We claim:

1. A process for increasing the polymerization rate of a liquid, polymerizable, unsaturated ether selected from the group consisting of polyallyl and polymethallyl ethers of polyhydroxy compounds free of functional groups other than hydroxyl, comprising mixing the ether with an ester of an acid selected from the group consisting of acrylic and methacrylic acid with a compound selected from the group consisting of saturated and unsaturated aliphatic alcohols, aromatic alcohols, heterocyclic alcohols, and phenolic compounds, in an amount sufficient to enhance the rate of viscosity increase, and passing a current of free-oxygen containing gas through the mixture at a temperature below the boiling point of said ester and below the decomposition temperature of the components of said mixture for a length of time sufficient to cause an increase of the viscosity of the mixture but not sufficient to convert it to a gel.

2. A process for increasing the polymerization rate of a liquid, polymerizable, unsaturated polyallyl ether of sucrose, comprising mixing the ether with an ester of an acid selected from the group consisting of acrylic and methacrylic acid with a compound selected from the group consisting of saturated and unsaturated aliphatic alcohols, aromatic alcohols, heterocyclic alcohols, and phenolic compounds, in an amount sufficient to enhance the rate of viscosity increase, and passing a current of free-oxygen containing gas through the mixture at a temperature below the boiling point of said ester and below the decomposition temperature of the components of said mixture for a length of time sufficient to cause an increase of the viscosity of the mixture but not sufficient to convert it to a gel.

3. A process for increasing the polymerization rate of a liquid, polymerizable, unsaturated polyallyl ether of mannitol, comprising mixing the ether with an ester of an acid selected from the group consisting of acrylic and methacrylic acid with a compound selected from the group consisting of saturated and unsaturated aliphatic alcohols, aromatic alcohols, heterocyclic alcohols, and phenolic compounds, in an amount sufficient to enhance the rate of viscosity increase, and passing a current of free-oxygen containing gas through the mixture at a temperature below the boiling point of said ester and below the decomposition temperature of the components of said mixture for a length of time sufficient to cause an increase of the viscosity of the mixture but not sufficient to convert it to a gel.

4. A process for increasing the polymerization rate of a liquid, polymerizable, unsaturated ether selected from the group consisting of polyallyl and polymethallyl ethers of polyhydroxy compounds free of functional groups other than hydroxyl, comprising mixing the ether with an ester of an acid selected from the group consisting of acrylic and methacrylic acid with a compound selected from the group consisting of saturated and unsaturated aliphatic alcohols, aromatic alcohols, heterocyclic alcohols, and phenolic compounds, said ester having a boiling point substantially above 100° C., in an amount sufficient to enhance the rate of viscosity increase, and passing a current of free-oxygen containing gas through the mixture at a temperature of about 100 C. for a length of time sufficient to cause an increase of the viscosity of the mixture but not sufficient to convert it to a gel.

5. A process for increasing the polymerization rate of a liquid, polymerizable, unsaturated ether selected from the group consisting of polyallyl and polymethallyl ethers of polyhydroxy compounds free of functional groups other than hydroxyl, comprising mixing the ether with an ester of an acid selected from the group consisting of acrylic and methacrylic acid with a compound selected from the group consisting of saturated and unsaturated aliphatic alcohols, aromatic alcohols, heterocyclic alcohols, and phenolic compounds, said ether and ester being in the weight ratio of about 1 to 1, and passing a current of free-oxygen containing gas through the mixture at a temperature below the boiling point of said ester and below the decomposition temperature of the components of said mixture for a length of time sufficient to cause an increase of the viscosity of the mixture but not sufficient to convert it to a gel.

6. A process for increasing the polymerization rate of a liquid, polymerizable, unsaturated polyallyl ether of sucrose, comprising mixing the ether with an ester of an acid selected from the group consisting of acrylic and methacrylic acid with a compound selected from the group consisting of saturated and unsaturated aliphatic alcohols, aromatic alcohols, heterocyclic alcohols, and phenolic compounds, said ether and ester being in the weight ratio of about 1 to 1, and passing a current of free-oxygen containing gas through the mixture at a temperature below the boiling point of said ester and below the decomposition temperature of the components of said mixture for a length of time sufficient to cause an increase of the viscosity of the mixture but not sufficient to convert it to a gel.

MORRIS ZIEF.
ELIAS YANOVSKY.

REFERENCES CITED

The following references are of record in the file of this patent:

UNITED STATES PATENTS

| Number | Name | Date |
| --- | --- | --- |
| 2,129,662 | Barrett | Sept. 13, 1938 |
| 2,129,666 | Barrett | Sept. 13, 1938 |
| 2,129,667 | Barrett | Sept. 13, 1938 |
| 2,273,891 | Pollack | Feb. 24, 1942 |
| 2,386,999 | Adelson | Oct. 16, 1945 |
| 2,462,817 | Smith | Feb. 22, 1949 |

OTHER REFERENCES

Nichols, Official Digest, March 1945, pages 111–123.